United States Patent
Elsner

(10) Patent No.: US 9,686,339 B2
(45) Date of Patent: Jun. 20, 2017

(54) SYSTEMS AND METHODS OF COMMUNICATING PLATFORM-INDEPENDENT REPRESENTATION OF SOURCE CODE

(71) Applicant: WOWZA MEDIA SYSTEMS, LLC, Golden, CO (US)

(72) Inventor: Robert Elsner, Pine, CO (US)

(73) Assignee: WOWZA MEDIA SYSTEMS, LLC, Golden, CO (US)

( * ) Notice: Subject to any disclaimer, the term of this patent is extended or adjusted under 35 U.S.C. 154(b) by 0 days.

(21) Appl. No.: 15/209,049

(22) Filed: Jul. 13, 2016

(65) Prior Publication Data

US 2016/0323347 A1 Nov. 3, 2016

Related U.S. Application Data

(63) Continuation of application No. 14/697,202, filed on Apr. 27, 2015, now Pat. No. 9,420,027.

(51) Int. Cl.
*H04L 29/06* (2006.01)
*H04L 29/08* (2006.01)

(52) U.S. Cl.
CPC ........ *H04L 65/604* (2013.01); *H04L 65/4069* (2013.01); *H04L 65/4084* (2013.01); *H04L 65/608* (2013.01); *H04L 67/34* (2013.01); *H04L 67/02* (2013.01)

(58) Field of Classification Search
CPC ....... G06F 8/60; H04L 45/563; H04L 65/604; H04L 65/608; H04L 65/4092; H04L 67/02; H04L 67/34; H04L 65/4069–65/4084
See application file for complete search history.

(56) References Cited

U.S. PATENT DOCUMENTS

| 6,938,047 B2* | 8/2005 | Kryeziu | H04N 21/435 707/E17.009 |
|---|---|---|---|
| 6,964,039 B2 | 11/2005 | Heeb | |
| 7,400,764 B2 | 7/2008 | Kryeziu | |
| 7,496,676 B2 | 2/2009 | Kryeziu | |
| 7,664,882 B2* | 2/2010 | Mohammed | H04N 21/4143 709/231 |
| 7,685,161 B2 | 3/2010 | Kryeziu | |
| 7,739,674 B2 | 6/2010 | Owens et al. | |

(Continued)

FOREIGN PATENT DOCUMENTS

| EP | 1623341 B1 | 7/2008 |
|---|---|---|
| WO | 0237471 A2 | 5/2002 |

*Primary Examiner* — Patrice Winder
(74) *Attorney, Agent, or Firm* — Toler Law Group, PC

(57) ABSTRACT

A method includes receiving, at a media player at a computing device, a first portion of a media stream, and initiating playback of the first portion of the media stream. The method also includes receiving a second portion of the media stream during the playback of the first portion of the media stream, the second portion of the media stream including a platform-independent representation of source code. The method further includes compiling the platform-independent representation of the source code to generate a platform-specific component that is executable by the computing device. The method includes executing the platform-specific component at the computing device during execution of the media player at the computing device.

20 Claims, 7 Drawing Sheets

(56) References Cited

U.S. PATENT DOCUMENTS

| | | |
|---|---|---|
| 7,783,767 B2 * | 8/2010 | Collazo ............ H04L 29/06027 |
| | | 709/225 |
| 8,745,579 B2 | 6/2014 | Johnson, Jr. et al. |
| 9,027,010 B2 | 5/2015 | Barraclough et al. |
| 9,137,567 B2 * | 9/2015 | Vestergaard ....... H04N 21/4341 |
| 9,210,211 B2 * | 12/2015 | Gomes ................... H04L 67/06 |
| 2006/0159366 A1 | 7/2006 | Darwish |
| 2006/0282501 A1 | 12/2006 | Bhogal et al. |
| 2008/0248782 A1 | 10/2008 | Stiers et al. |
| 2009/0024925 A1 * | 1/2009 | Stevens ................ G11B 27/034 |
| | | 715/716 |
| 2010/0077322 A1 | 3/2010 | Petro et al. |
| 2010/0332568 A1 | 12/2010 | Morrison et al. |
| 2011/0219357 A1 * | 9/2011 | Livshits ................. G06F 9/445 |
| | | 717/115 |
| 2012/0173967 A1 * | 7/2012 | Lillesveen ............ G06F 17/227 |
| | | 715/235 |
| 2012/0304156 A1 | 11/2012 | Feiveson et al. |
| 2013/0044824 A1 | 2/2013 | Vestergaard et al. |
| 2013/0111515 A1 | 5/2013 | Mehta et al. |
| 2013/0185626 A1 * | 7/2013 | Jang .................... G06F 9/45516 |
| | | 715/234 |
| 2013/0254675 A1 | 9/2013 | De Andrade et al. |
| 2014/0047413 A1 * | 2/2014 | Sheive ................. H04L 65/403 |
| | | 717/110 |
| 2014/0156863 A1 | 6/2014 | Gao et al. |
| 2014/0245277 A1 | 8/2014 | Petro et al. |

\* cited by examiner

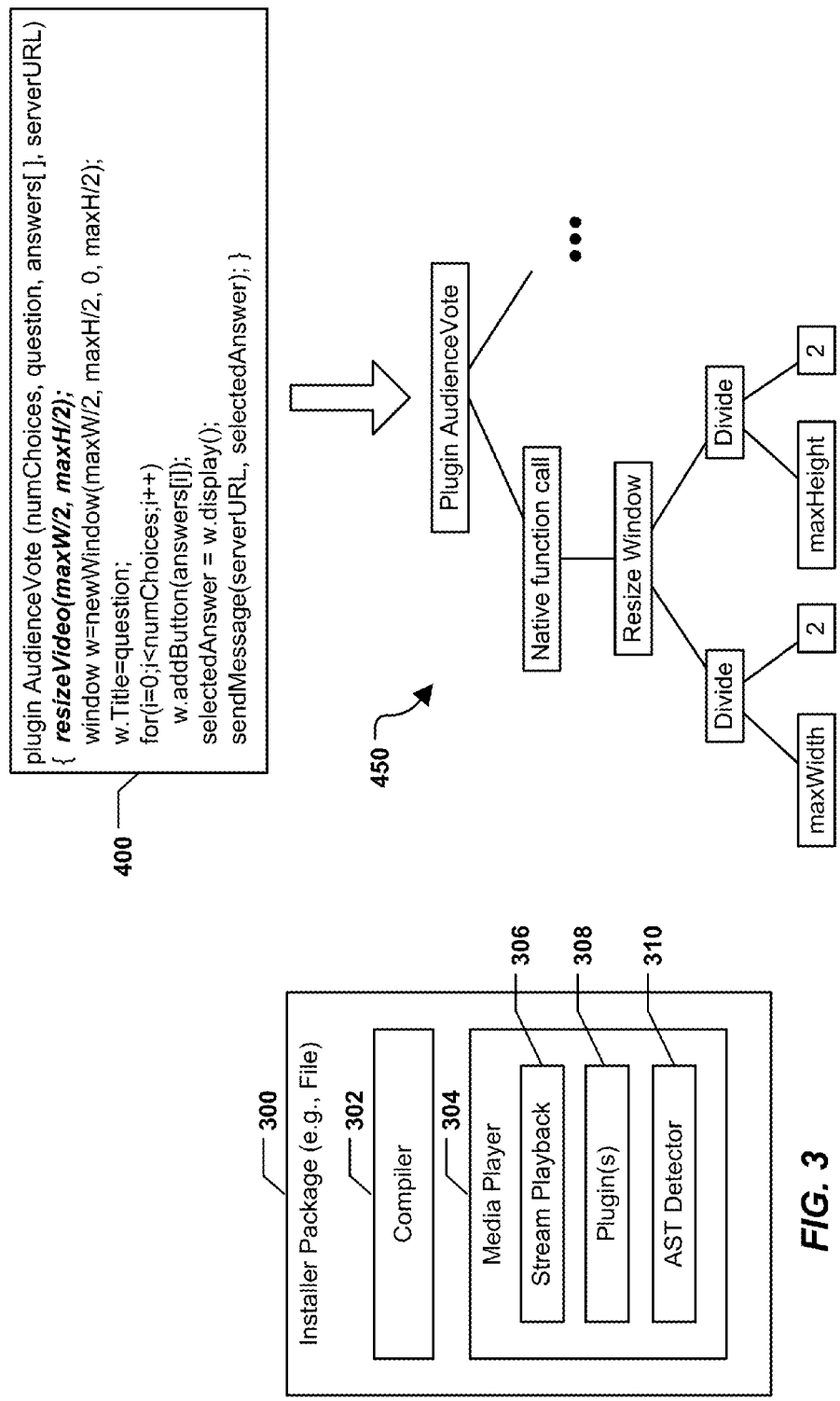

SYSTEMS AND METHODS OF COMMUNICATING PLATFORM-INDEPENDENT REPRESENTATION OF SOURCE CODE

CROSS-REFERENCE TO RELATED APPLICATIONS

The present application is a continuation of and claims priority to U.S. patent application Ser. No. 14/697,202, filed Apr. 27, 2015, the content of which is incorporated by reference herein in its entirety.

BACKGROUND

The popularity of the Internet, coupled with the increasing capabilities of personal/mobile electronic devices, has provided consumers with the ability to enjoy multimedia content almost anytime and anywhere. For example, live content (e.g., sports events) and video on demand (VOD) content (e.g., television shows and movies) can be streamed via the Internet to personal electronic devices (e.g., computers, mobile phones, Internet-enabled televisions, etc.). Various types of personal electronic devices are available to consumers. Different devices may have different screen sizes and may be compatible with different audio formats, video formats, streaming protocols, wireless connection speeds, etc.

To playback video streams, electronic devices typically execute a media player software application, alternatively referred to as a "player." Some operating systems for mobile phones, tablet computers, etc. have built-in players. Users can also download third-party players to their devices for free or for a fee. To offer a player for multiple types of electronic devices, a software company may have to develop the player for multiple hardware/software platforms, including reprogramming or porting source code into multiple programming languages and compiling the player application separately for each of the platforms. Moreover, this process may be repeated each time a new version of the player, or new functionality (e.g., a plugin) is released.

SUMMARY

The present application provides a system and method to deploy a player or plugin without having to manually develop/port/compile the player or plugin into the native formats for each hardware/software platform. In accordance with the described techniques, plugin (or player) code may be written in one language and may be automatically translated into other languages for multiple platforms. To enable the translation, compiling the plugin source code may include parsing the source code to produce a platform-independent intermediate format representation of the code.

The intermediate format representation may be streamed to player devices for platform-specific compilation. Thus, to deploy a new plugin, the plugin can be written once in a high-level language and then parsed to generate an intermediate format representation that is streamed to individual player devices that convert the intermediate format representation into a platform-specific representation.

One example of an intermediate format representation is an abstract syntax tree (AST). The AST can be delivered to player devices as part of a media stream for a live or video on demand (VOD) event. For example, a "poll the viewers" plugin can be delivered in just-in-time fashion during streaming of a game show. As another example, a social networking plugin that is executable from within the player application can be delivered as part of a media stream to enable a user to send and receive social networking messages from within the player application while viewing the media stream.

Upon receiving the AST, a player device compiles and links the AST into a platform-specific or "native" implementation (e.g., machine language and/or binary code) for that player device. The platform-specific implementation can include, but is not limited to, x86 for Windows or Mac OS devices, x86 or ARM for Android devices, ARM for iOS devices, RISC or ARM for set-top boxes, etc. The compiler that compiles the AST to generate the native implementation can be a part of the player (e.g., the compiler can be automatically installed when the user downloads the player from an application storefront). Advantageously, because the AST is compiled into native code, the compiled plugin will use controls that match the native "look and feel" of the platform. The player device may erase the compiled plugin after use, or the player device may can cache the compiled plugin for subsequent use (e.g., so that the AST does not have to be streamed to the player device the next time a game show contestant elects to "poll the viewers").

It is noted that the techniques of the present application differ from virtual machines (e.g., for Java and C#) and interpreters (e.g., used for OpenTV and enhanced TV binary interchange format (EBIF)) because a separate virtual machine or interpreter is not relied upon to generate platform-specific commands via translation. Instead, the player compiles a platform-independent AST on-the-fly to generate a native plugin, where receipt of the AST, compilation of the AST, and execution of the native plugin can occur during a streaming session without interrupting receipt and playback of a media stream. Compiling ASTs into native runtimes may also result in improved performance as compared to using a virtual machine or interpreter, which introduces a layer of indirection that can result in loss of performance (e.g., loss of speed) during plugin execution. The just-in-time delivery of plugins described in the present application may also be more convenient than requiring users to download/reinstall an updated version of the player each time a new plugin is developed or an existing plugin is updated.

BRIEF DESCRIPTION OF THE DRAWINGS

FIG. 3 is a diagram of an illustrative embodiment of a media player installer package;

FIG. 4 is a diagram of an illustrative embodiment of parsing source code to generate an abstract syntax tree;

DETAILED DESCRIPTION

Figure 1:
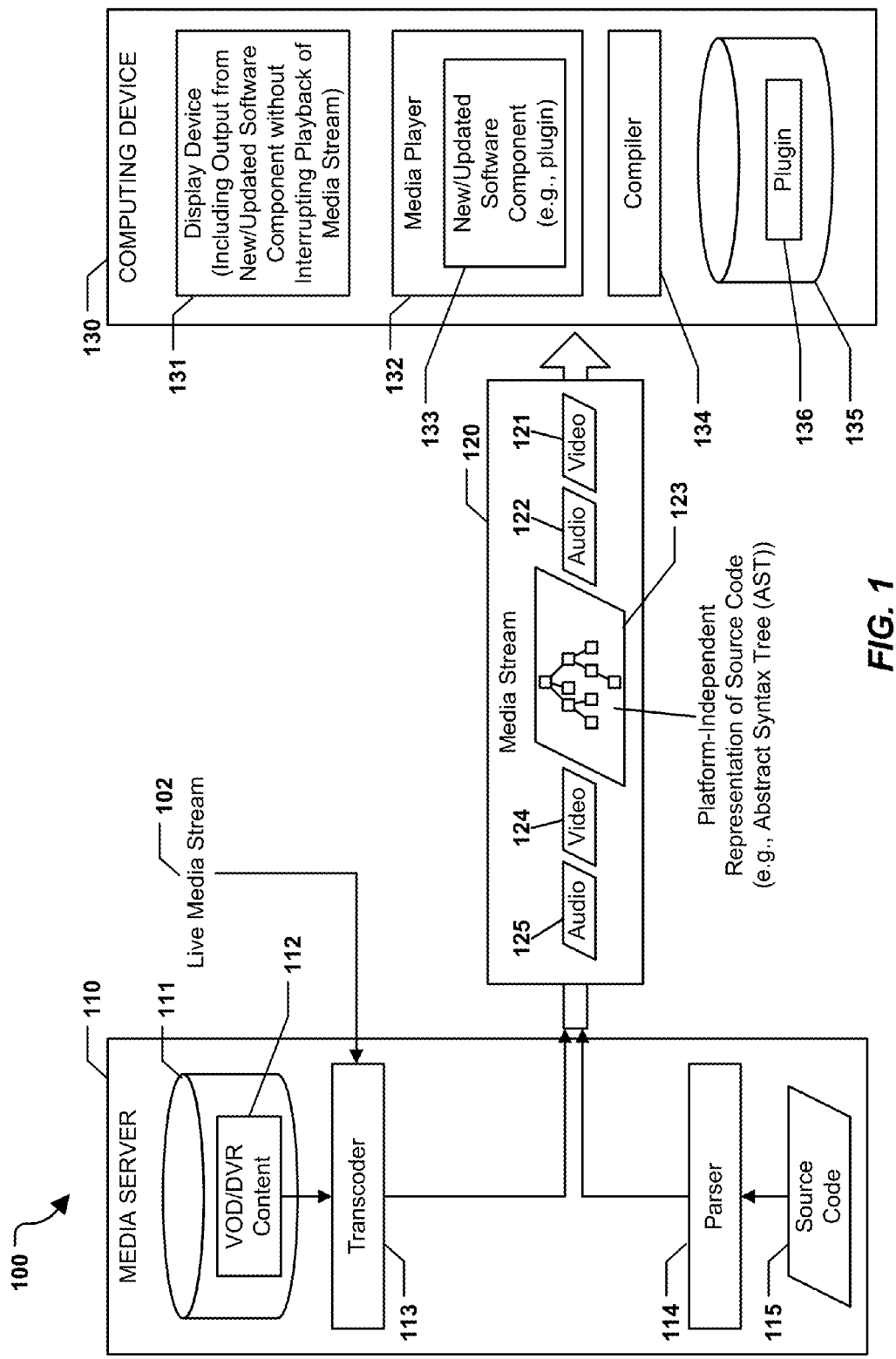
FIG. 1 is a diagram of an illustrative embodiment of a system that is operable to support communication of a platform-independent representation of source code to a computing device.

FIG. 1 illustrates a particular embodiment of a system 100 that includes a media server 110 and a computing device 130. The media server 110 may receive data (e.g., a live media stream 102 from a capture device, such as a camera, or from another media server or computing device). The media server 110 may also send data (e.g., an illustrative media stream 120) to the computing device 130 and/or another device. In a particular embodiment, the media server 110 communicates via networks, such as a local area network (LAN) or the Internet, via a wired or wireless network connection. It should be noted that although certain operations may be described herein as being performed by the media server 110 or the computing device 130, in alternative embodiments such operations may be performed by one or more other types of devices, such as desktop computers, laptop computers, mobile phones/smartphones, tablet computers, portable computing devices, game consoles, set-top boxes, televisions, cloud servers, etc. Moreover, operations described as being performed by one device may alternatively be performed by another device.

The media server 110 may include a data storage device(s) 111, which may include non-volatile storage devices (e.g., disk-based storage device(s)), cache storage devices (e.g., static random-access memory (SRAM)), or a combination of both. The data storage device(s) 111 may store content 112 (e.g., video on demand (VOD) and/or digital video recorder (DVR)) content.

The media server 110 may also include a transcoder 113 configured to transcode the live media stream 102 and/or the content 112. To illustrate, the transcoder 113 may generate multiple versions of the live media stream 102 and/or the content 112 for communication to player devices, such as the computing device 130. In the example of FIG. 1, the transcoder 113 generates audio/video data 121, 122, 124, 125 for transmission as part of the media stream 120. Each of the audio/video data 121, 122, 124, 125 may correspond to one or more data packets formatted in accordance with a multimedia communication protocol, as further described with reference to FIG. 8.

In a particular embodiment, to facilitate the use of adaptive bitrate (ABR) streaming, the transcoder 113 may generate multiple ABR renditions of the live media stream 102 and/or the content 112. Each ABR rendition may have a distinct bitrate (e.g., video bitrate and/or audio bitrate). ABR renditions may also differ from each other with respect to other audio and video quality parameters, such as frame size, frame rate, video coder/decoder (CODEC), audio CODEC, number of audio channels, etc. Thus, the transcoder 113 may perform bitrate conversion, CODEC conversion, frame size conversion, etc. The media server 110 may provide one or more of the ABR renditions generated by the transcoder 113 to other devices, such as the computing device 130. ABR streaming is further described with reference to FIG. 8.

The media server 110 may also include a parser 114. The parser may 114 receive source code 115 and may generate a platform-independent representation 123 of the source code 115. As used herein, a "platform independent representation" of source code is a representation that can be compiled by different compilers to generate "native" (e.g., platform-specific) applications (e.g., instructions) that are executable at a device without further translation or interpretation. For example, the same platform independent representation 123 may be compiled at a first device to generate a native executable for a first instruction set architecture and may be compiled at a second device to generate a native executable for a second instruction set architecture. Examples of platform-specific architectures include, but are not limited to, x86 for Windows or Mac OS devices, x86 or ARM for Android devices, ARM for iOS devices, RISC or ARM for set-top boxes, etc. An illustrative non-limiting example of a platform-independent representation of source code is an abstract syntax tree (AST), which is further described with reference to FIG. 4.

The computing device 130 may include a display device 131, a media player 132 (e.g., a media player software application), a compiler 134, and data storage device(s) 135. The media player 132 may be configured to receive the media stream 120 and initiate output of the media stream 120 (e.g., display of video at the display device 131 and output of audio at a speaker or headset/auxiliary output). The media player 132 may also be configured to detect that the platform-independent representation 123 has been received, and to invoke the compiler 134 to compile the platform-independent representation 123.

The compiler 134 may compile the platform-independent representation 123 to generate a native (e.g., platform-specific) executable. Thus, the compiler 134 may be specific to an architecture, operating system, etc. of the computing device. In the example of FIG. 1, the compiler 134 generates a software component 133 for the media player 132. The software component 133 may be a new software component or an update to an existing software component at the media player 132. For example, the software component 133 may be a plugin that can be executed by the media player 132 without interrupting playback of the media stream 120 at the display device 131. Illustrative examples of such plugins are further described with reference to FIGS. 2 and 5. The software component 133 can be stored at the computing device 130 or can be deleted after execution. In the example of FIG. 1, a plugin 136 has been stored in the data storage device(s) 135, e.g., so that the plugin 136 can be subsequently retrieved (e.g., based on a search using a name or identifier of the plugin 136) and re-executed by the media player 132 without invoking the compiler 134 and re-compiling the platform-independent representation 123. For example, as further described with reference to FIG. 2, the computing device 130 may receive a signal (e.g., a plugin call) to re-execute the plugin 136, and may retrieve and re-execute the plugin 136 in response to the signal. The signal (e.g., plugin call) may be received as part of the media stream 120, as part of a separate media stream, or independent (e.g., outside) of a media stream.

It should be noted that although the compiler 134 is shown external to the media player 132 in FIG. 1, in alternative embodiments, the compiler 134 may part of the media player 132. Thus, in accordance with the present disclosure, an installer package (e.g., file) for the media player 132 may include both the compiler 134 and the media player 132. In an illustrative example, the installer package may be downloaded and to the computing device 130 from an application storefront, via a download URL, etc. FIG. 3 illustrates an example of such an installer package 300. The installer package 300 may be stored in a computer-readable storage device, such as the data storage device(s) 111, the data storage device(s) 135, etc. Examples of installer packages include, but are not limited to, .exe files, .apk files, .msi files, .app files, .dmg files, etc. As shown in FIG. 3, the installer package 300 includes both a compiler 302 and a media player 304. The compiler 302 may be designed to generate native runtimes/executables for a particular device type, architecture, operating system, etc. The media player 304 may include executable instructions for stream playback 306. The media player 304 may also include plugin(s) 308 that are installed as part of the installation process for the media player 304. Such pre-installed plugin(s) 308 may be updated using the platform-independent representation 123 of FIG. 1, as described above. The media player 304 may also include a detector 310 to detect receipt of a platform-independent representation (e.g., an AST) and to invoke the compiler 302 to compile the platform-independent representation.

Other computing devices (not shown in FIG. 1) may similarly include compilers that can generate platform-specific plugins for those devices. It will thus be appreciated that through communication of the platform-independent representation 123, the system 100 of FIG. 1 enables a write-once-execute-anywhere paradigm for deploying software components (or entire software applications). Software developers can write the source code 115 once and each computing device that receives the platform-independent representation 123 can compile the platform-independent representation 123 into the appropriate native binary for execution without interrupting playback of the media stream 120. In addition, when multiple devices are receiving the media stream 120, each such device can compile and generate its own software component 133 from the same platform-independent representation 123. Thus, a software vendor may no longer have to distribute various platform-specific updates to different devices (e.g., via different application storefronts or update notifications).

During operation, the media server 110 may transmit the media stream 120 to the computing device 130 and to one or more other computing devices (e.g., via unicast, multicast, broadcast, etc.). The media stream 120 may include various portions. For example, a first portion of the media stream 120 may include the video data 121 and the audio data 122, a second portion of the media stream 120 may include the platform-independent representation 123, and a third portion of the media stream 120 may include the video data 124 and the audio data 125. The media player 132 may initiate playback of the video data 121 and the audio data 122. The compiler 134 may compile the platform-independent representation 123 to generate the software component 133, which may be executed by the media player 132 without interrupting playback of the media stream 120. For example, the display device 131 may seamlessly transition from displaying the video data 121 to displaying the video data 124 while the software component 133 is executed.

The system 100 of FIG. 1 may thus enable communication of software components within a media stream for on-the-fly compilation and execution. The compilation and execution of the software components may be transparent from the perspective of the user, and may thus be preferable to requiring download and installation of a new version of the media player 132 each time a new plugin is developed or an existing plugin is updated. It is noted that the techniques of the present application differ from virtual machines (e.g., for Java and C#) and interpreters (e.g., used for OpenTV and enhanced TV binary interchange format (EBIF)) because a separate virtual machine or interpreter is not relied upon to generate platform-specific commands via translation. Instead, a compiler within the media player (or invoked by the media player) compiles a platform-independent representation on-the-fly to generate a native plugin, where receipt of the platform-independent representation, compilation of the platform-independent representation, and execution of the native plugin can occur during a streaming session for a media stream without interrupting receipt and playback of a media stream. Compiling a platform-independent representation into a native runtime may also result in improved performance as compared to using a virtual machine or interpreter, which introduces an additional layer of indirection Whereas FIG. 1 illustrates communication of the platform-independent representation 123 as part of the media stream 120, the present disclosure also provides for communicating a platform-independent representation separately from a media stream and/or from a separate server/device than the server/device communicating the media stream. For example, in the system 200 of FIG. 2, the media server 110 sends the platform-independent representation 123 to the computing device 130, whereas different servers 240, 250 send media streams 242, 252 to the computing device 130.

The platform-independent representation 123 and the media streams 242, 252 may be sent to the computing device 130 at various times and in various orders. As a first example, the computing device 130 may receive the media stream 242 from the server 240. The media stream 242 may include a plugin call, e.g., a command that causes a media player of the computing device 130 to execute a particular plugin. The media player may check whether the called plugin is available (e.g., by searching a data storage device or cache using a name or identifier of the plugin). If the called plugin is available, the media player may execute the plugin. If the plugin is not available, the media player may request the platform-independent representation 123 from the media server 110. For example, the plugin call in the media stream 232 may include information indicating that the platform-independent representation 123 can be requested from the media server 110. To illustrate, the plugin call may include a uniform resource locator (URL) for the platform-independent representation 123, where the URL identifies the media server 110. The computing device 130 may receive the platform-independent representation 123 from the media server 110, compile the platform-independent representation 123, and execute the resulting plugin without interrupting playback of the media stream 242, as described with reference to FIG. 1. In an alternative embodiment, the media server 110 may send the platform-independent representation 123 to the computing device 130 in response to a request from the server 240. Thus, the present disclosure may enable just-in-time acquisition of a plugin in response to a request from a media player, a server, etc.

In another example of operation, the computing device 130 may have received and compiled the platform-independent representation 123 prior to receiving the plugin call in the media stream 242 or a plugin call in the media stream 252. In response to the plugin call, the computing device 130 may execute the previously compiled plugin. Thus, the present disclosure may enable different content providers or servers (e.g., the servers 240, 250) to invoke a common plugin of a media player. The plugin calls from the different content providers or servers may have different data. To illustrate, in the example of FIG. 2, an audience voting plugin presents choices for where a viewer thinks a reality television character named John should go. A different content provider or server may call the same audience voting plugin but may provide a different question, different answer choices, etc. For example, during a game show, the same audience voting plugin may be used to let viewers answer a trivia question. As another example, during a talent show, the same audience voting plugin may be used to determine which contestant(s) will be voted off the show.

When a user of the computing device 130 interacts with a plugin, the plugin may generate data that is transmitted to a destination identified by the plugin or by the plugin call that resulted in execution of the plugin. To illustrate, in the example of FIG. 2, after the user selects the depicted "Downstream," "Upstream," or "Into the Jungle" button, the computing device 130 may send the server 240 data 244 indicating the user's selection. The server 240 may aggregate the data 244 with data received from other devices (e.g., to determine where John should go in next week's episode).

Figure 2:
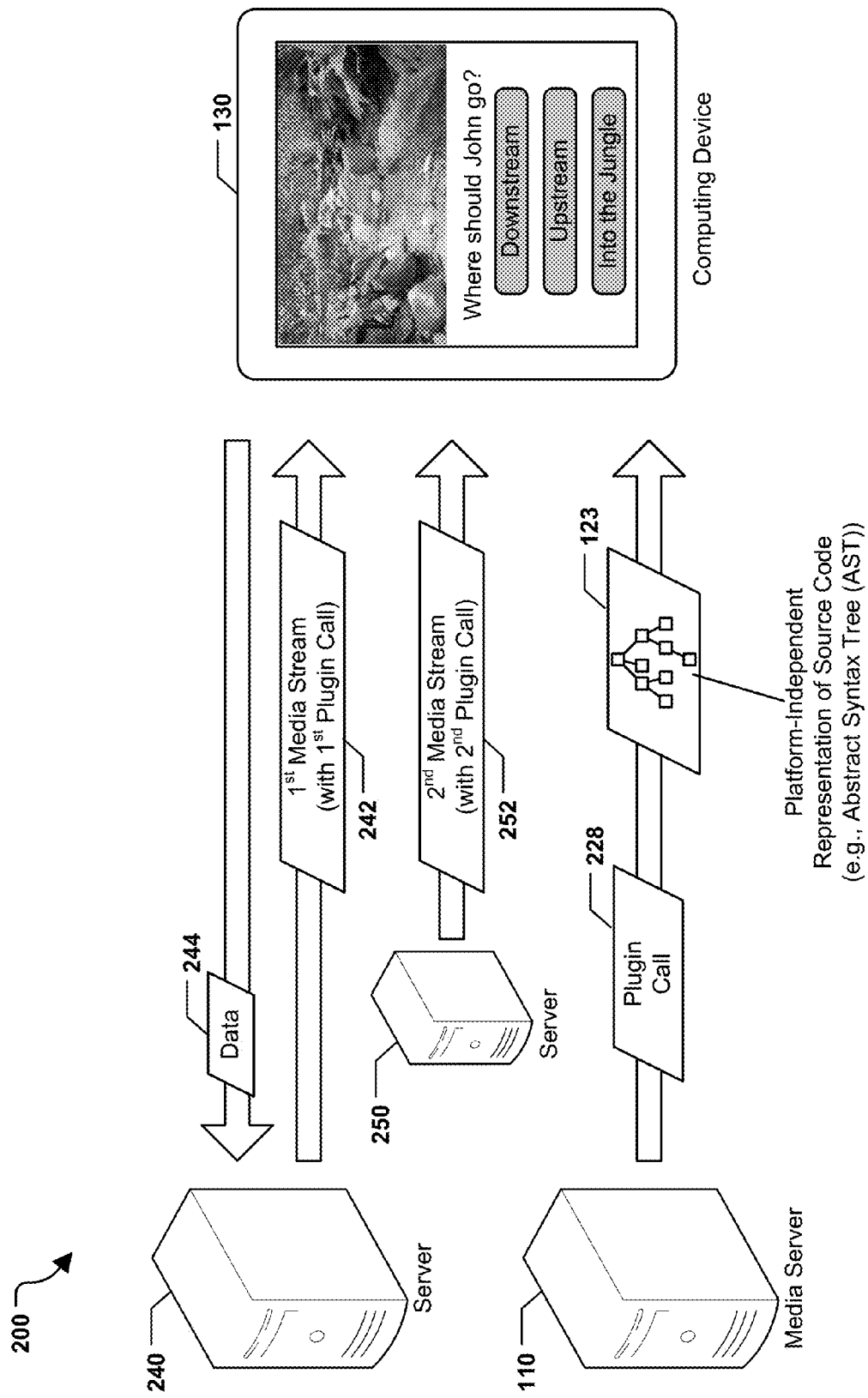
FIG. 2 is a diagram of another illustrative embodiment of a system that is operable to support communication of a platform-independent representation of source code to a computing device.

In another example of operation, a plugin call can be sent to the computing device 130 outside of a media stream. For example, as shown in FIG. 2, the media server 110 may send the plugin call 228 to the computing device 130 without the plugin call 228 being part of a media stream. The present disclosure thus enables a device to invoke a plugin on another device by sending a plugin call within or separately from a media stream. In a particular embodiment, plugin calls include security measure to prevent unauthorized parties from invoking plugins. For example, plugin calls may include identify information, cryptographic keys, etc., and the computing device 130 may check such security measures prior to executing a plugin.

In other examples of operation, the platform-independent representation 123 and/or a plugin call (e.g., the plugin call 228) may be sent to the computing device 130 in response to a schedule or timer (e.g., for periodic software updates), in response to user input at the media server 110 (e.g., when a software vendor elects to deploy a plugin update), etc. The systems of FIGS. 1-2 thus enable deploying plugins to computing devices having different device types, operating systems, architectures, etc. in various scenarios without having to develop platform-specific source code for each of the device types, operating systems, architectures, etc.

FIG. 4 depicts an example of source code 400 for the audience voting plugin illustrated in FIG. 2 and an abstract syntax tree (AST) 450 that may be generated from the source code. It should be noted that the C-style source code 400 and the format of the AST 450 shown in FIG. 4 are for example only, and are not to be considered limiting. In alternative embodiments, the systems and methods of the present disclosure may be used with different types of source code and different types of ASTs or other platform-independent representations of source code.

The source code 400 for the audience voting plugin includes a statement to resize a current video playback window to half its size (e.g., resize width of the window to half the maximum available width and resize height of the window to half the available height). It is to be noted that the resizeVideo( ) function included in the source code 400 may be platform-independent. That is, a native resizeVideo( ) function may not be available at individual media player devices that the audience voting plugin is deployed to. Instead, during compilation of the AST 450 (e.g., in a top-to-bottom, left-to-right fashion), a compiler at a media player device may convert the resizeVideo( ) function call to one or more platform-specific (e.g., native) function calls for that media player device. The compiler may thus compile the AST 450 into native high-level language (HLL) instructions, native assembly or machine language instructions (e.g. loads, stores, jumps, etc.), etc. Thus, in a particular embodiment, each compiler may store mappings between platform-independent function calls (e.g., resizeVideo( )) used by software developers and the native function calls and/or instructions that the platform-independent function calls are to be converted into during compilation.

It will be appreciated that by converting an AST into native function calls, the systems and methods of the present disclosure may preserve native formatting of graphical user interface (GUI) elements. For example, the same audience voting plugin, when executed at different devices, may use different native GUI styles (e.g., rounded buttons vs. rectangular buttons, certain font styles, etc.). Thus, from the perspective of a user, plugins deployed in accordance with the described techniques may appear to be a natural part of a media player application, and may not appear out-of-place or as a potentially incompatible add-on.

In FIG. 4, the depicted portion of the AST 450 corresponds to the resizeVideo( ) function call in the source code 400 (which is emphasized using bold and italic type). It is to be understood that the remaining instructions in the source code 400 may be parsed into additional branches/sub-branches of the AST 450, which are omitted for clarity.

As described with reference to FIG. 2, the same audience voting plugin may be invoked with different questions and answers and may send user selection data to different destination servers. In the example, of FIG. 4, this flexibility is represented using input parameters for the number of answer choices ("numChoices"), the question ("question"), the list of answers ("answers[ ]"), and the destination server URL ("serverURL"). The audience voting plugin may thus be called with different values of the input parameters at different times to implement different types of audience voting scenarios.

Figure 5:
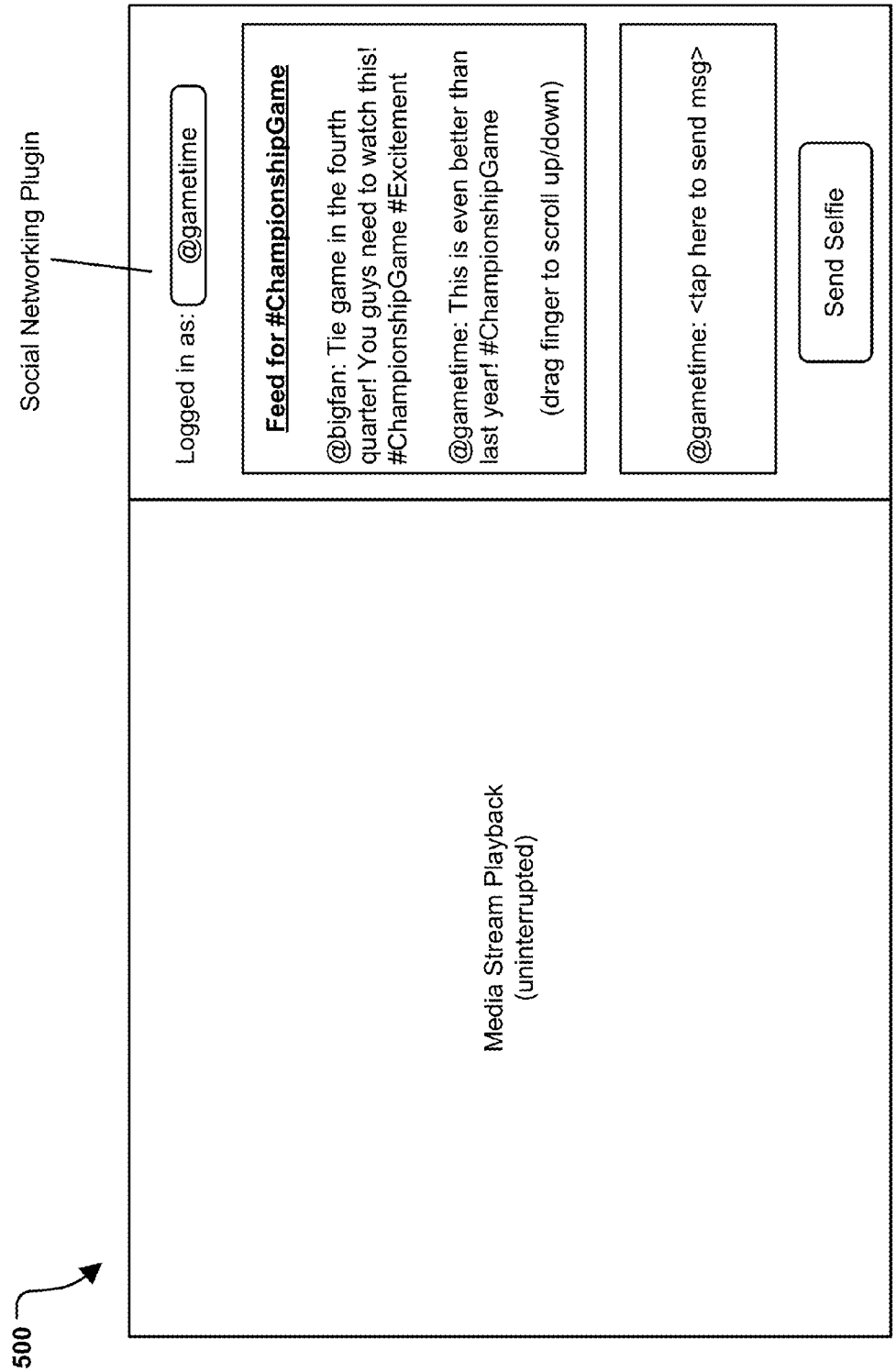
FIG. 5 is a diagram of an illustrative embodiment of a social networking plugin for a media player application.

FIG. 5 illustrates another example of a plugin that may be compiled and executed by a media player without interrupting playback of a media stream, and is generally designated 500. The plugin shown in FIG. 5 is a social network client that enables a user to read social networking messages, post social networking messages, and post a selfie (e.g., captured by a camera of a computing device) without interrupting playback of a media stream.

It should be noted that the plugin examples described and illustrated herein are for example only, and are not to be considered limiting. The systems and methods of the present disclosure may also be used with other types of plugins, such as a chat plugin or a plugin to adjust audio/video playback within the media player (e.g., a play speed adjustment plugin, a music visualization plugin, etc.). As additional non-limiting examples, a song identifier or lyrics retrieval plugin may be deployed in accordance with the present disclosure, where such plugins search one or more remote databases based on to identify a song that is being played by a media player or to retrieve lyrics for the song being played by the media player. To illustrate, the data 244 sent by the computing device 130 may correspond to a search query issued by a song identifier plugin or a lyrics retrieval plugin. The search query may be received by a server (e.g., the server 240), and the server may provide search results to the computing device 130, where the search results are displayed (e.g., in a plugin window) without interrupting playback of the song. Moreover, it is to be understood that the systems and methods of the present disclosure can be used to update functionality at applications other than a media player (e.g., a web browser, a game, a word processor, a spreadsheet application, a presentation application, etc.)

Figure 6:
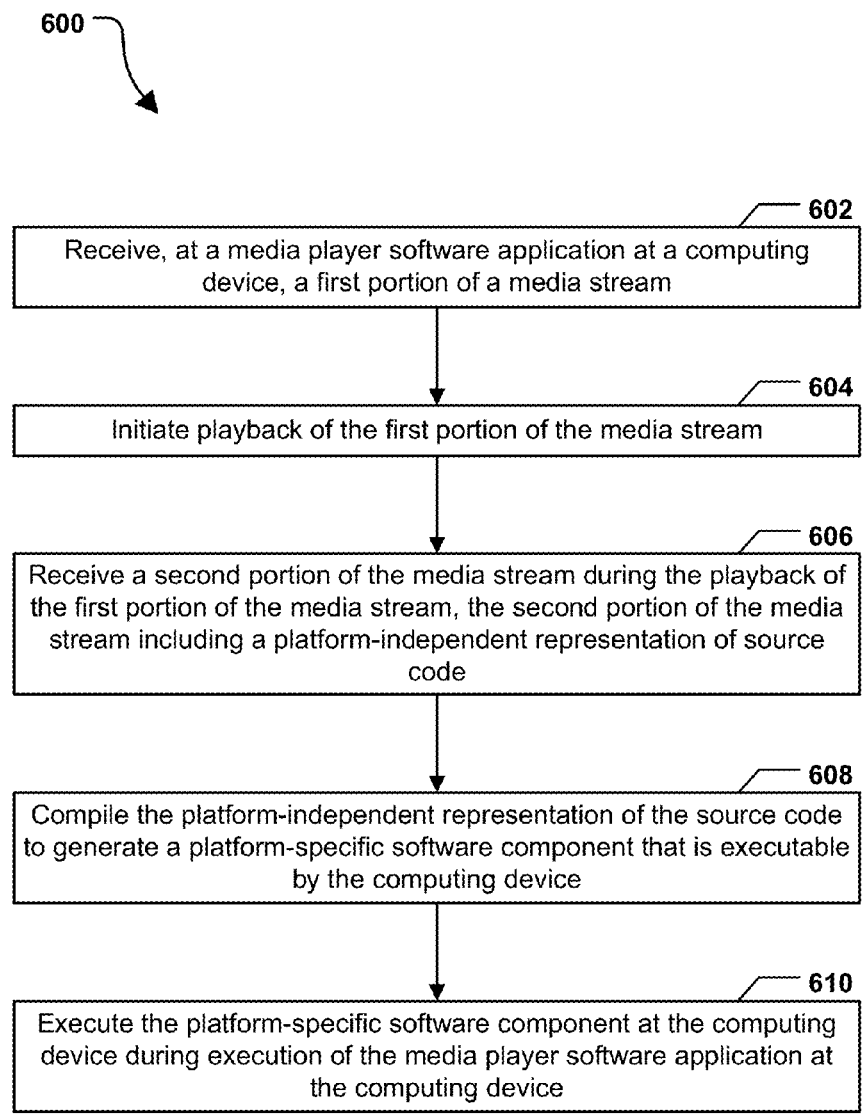
FIG. 6 is a flowchart of an illustrative embodiment of a method of dynamically compiling and executing a software component.

FIG. 6 is a flowchart to illustrate a particular embodiment of a method 600 of operation at a computing device. In an illustrative embodiment, the method 600 may be performed by the computing device 130 of FIGS. 1-2.

The method 600 includes receiving, at a media player software application at a computing device, a first portion of a media stream, at 602. The method 600 also includes initiating playback of the first portion of the media stream, at 604. For example, in FIG. 1, the computing device 130 may receive and initiate playback of a first portion of the media stream 120, such as the video data 121 and the audio data 122.

The method 600 also includes receiving a second portion of the media stream during the playback of the first portion of the media stream, at 606. The second portion of the media stream may include a platform-independent representation of source code. For example, in FIG. 1, during playback of the video data 121 and the audio data 122, the computing device 130 may receive the platform-independent representation 123 of the source code 115.

The method 600 further includes compiling the platform-independent representation of the source code to generate a platform-specific software component that is executable by the computing device, at 608. The method 600 includes executing the platform-specific software component at the computing device during execution of the media player software application at the computing device, at 610. For example, in FIG. 1, the compiler 134 may compile the platform-independent representation 123 to generate the software component 133, and the software component 133 may be executed by the media player 132, without interrupting playback of the media stream 120. The software component 133 may be stored at the computing device 130 or may be deleted after execution.

Figure 7:
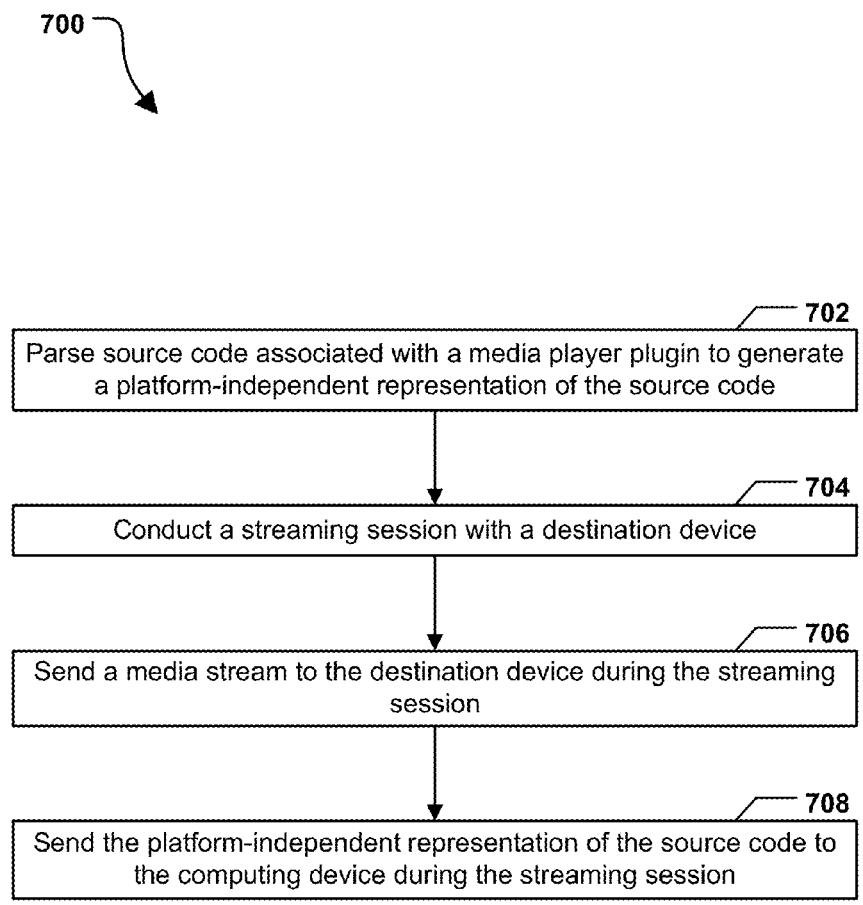
FIG. 7 is a flowchart of an illustrative embodiment of a method of generating a platform-independent representation of a software component.

FIG. 7 is a flowchart to illustrate a particular embodiment of a method 700 of operation at a device. In an illustrative embodiment, the method 700 may be performed by a server, such as the media server 110 of FIGS. 1-2, the server 240 of FIG. 2, or the server 250 of FIG. 2.

The method 700 includes parsing source code associated with a media player plugin to generate a platform-independent representation of the source code, at 702. For example, in FIG. 1, the parser 114 may parse the source code 115 to generate the platform independent representation 123. In a particular embodiment, the parsing process includes converting commands included in the source code 115 into an AST, as described with reference to FIG. 4. For example, certain commands included in the source code 115 may be converted into platform-independent commands that can be compiled by different compilers at different media player devices. In an alternative embodiment, the media server 110 may not parse the source code 115 (e.g., the parser 114 may be optional). Instead, the media server 110 may receive the platform-independent representation 123 from another device for distribution to computing devices (e.g., the computing device 130). Thus, in such a scenario, the media server 110 may function as a software distribution server, and a software vendor may generate the platform-independent representation 123 elsewhere prior to providing the platform-independent representation 123 to the media server 110 for distribution to customers.

The method 700 also includes conducting a streaming session with a destination device, at 704, and sending a media stream to the destination device during the streaming session, at 706. For example, in FIG. 1, the media server 110 may conduct a streaming session with the computing device 130 and send the media stream 120 to the computing device 130 during the streaming session. In particular embodiment, initiating and conducting a streaming session includes forming a connection between an output port of the media server 110 and an input port of the computing device 130, allocating a network path between the media server 110 and the computing device 130, performing other session setup operations, etc.

The method 700 further includes sending the platform-independent representation of the source code to the computing device during the streaming session, at 708. For example, in FIG. 1, the media server 110 may send the platform-independent representation 123 to the computing device 130.

Figure 8:
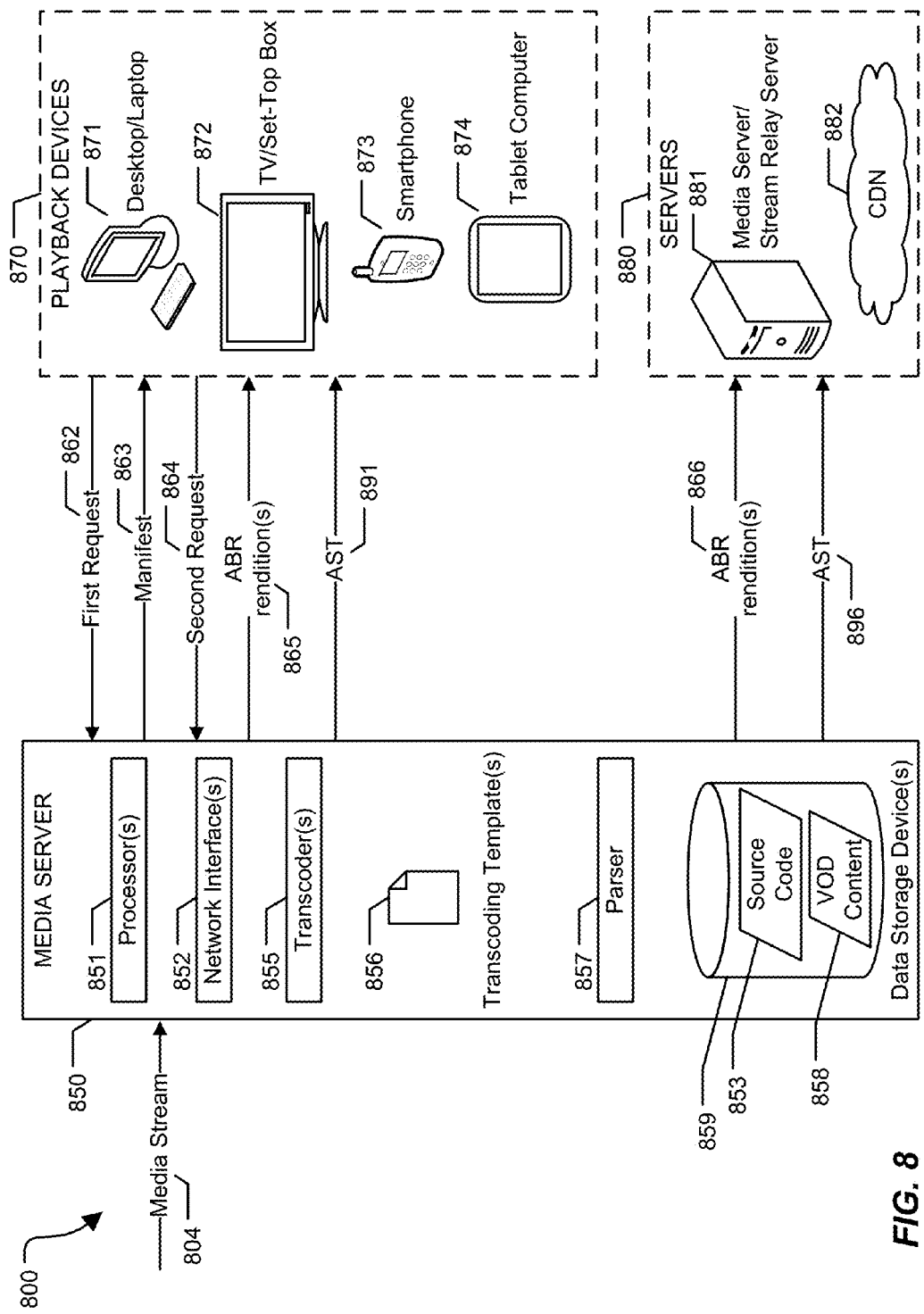
FIG. 8 is a diagram of another illustrative embodiment of a system that is operable to support communication of a platform-independent representation of source code to a computing device.

FIG. 8 illustrates another particular embodiment of a system 800 in accordance with the present disclosure. The system 800 includes a media server 850, which may correspond to the media server 110 of FIGS. 1-2, the server 240 of FIG. 2, or the server 250 of FIG. 2. The media server 850 may include one or more processor(s) 851 and various components that are executable by the processor(s) 851. The media server 850 may include software application(s) that perform media serving or processing, hardware systems (e.g., servers) that support or perform media serving and processing, or any combination thereof. Thus, various operations described with reference to the media server 850, or components thereof, may be implemented using hardware, software (e.g., instructions executable by the processor(s) 851), or any combination thereof.

The media server 850 may also include one or more network interface(s) 852. For example, the network interface(s) 852 may include input interface(s) and output interface(s) that are configured to receive data and to send data, respectively. In a particular embodiment, the network interface(s) 852 may be wired and/or wireless interfaces that enable the media server 850 to communicate data via a network, such as the Internet. For example, the network interface(s) 852 may include an Ethernet interface, a wireless interface compatible with an Institute of Electrical and Electronics Engineers (IEEE) 802.11 (e.g., Wi-Fi) protocol, or other wired or wireless interfaces.

Thus, the media server 850 may be configured to receive and send data from various other devices (e.g., via a network, such as a local area network (LAN) or the Internet, via a wired or wireless network connection). For example, the media server 850 may communicate with one or more playback devices 870 (e.g., devices configured to output a display of a stream of live content and/or a stream of a VOD content item) and one or more other servers 880. The one or more playback devices 870 may include the computing device 130 of FIGS. 1-2. In a particular embodiment, the media server 850 may receive a media stream 804. In an illustrative example, the media stream 804 is received via one or more stream capture sources (e.g., a camera or a video encoder) or via one or more media content servers (e.g., a video on demand (VOD) database server or a server of a content delivery network (CDN)). Accordingly, the media stream 804 may include a live stream or a VOD stream. In an illustrative example, the media stream 804 corresponds to the live media stream 102 of FIG. 1.

The media server 850 may support multiple coding technologies and protocols. For example, the media server 850 may support video encoding types including, but not limited to, H.264, On2 VP6, Sorenson Spark, Screen video, Screen video 2, motion picture experts group (MPEG) 2 (MPEG-2), MPEG-4 Part 2, and MPEG-4 Part 10. The media server 850 may support audio encoding types including, but not limited to, advanced audio coding (AAC), AAC low complexity (AAC LC), AAC high efficiency (HE-AAC), G.711, MPEG Audio Layer 3 (MP3), Speex, Nellymoser Asao, and AC-3.

The media server 850 may support communication (e.g., adaptive streaming and non-adaptive streaming) protocols including, but not limited to, hypertext transfer protocol (HTTP) live streaming (HLS), HTTP dynamic streaming (HDS), smooth streaming, and MPEG dynamic adaptive streaming over HTTP (MPEG-DASH) (also known as international organization for standardization (ISO)/international electrotechnical commission (IEC) 23009-1). The media server 850 may also support real time messaging protocol (RTMP) (and variants thereof), real-time streaming protocol (RTSP), real-time transport protocol (RTP), and MPEG-2 transport stream (MPEG-TS). Additional audio formats, video formats, coder/decoders (CODECs), and/or protocols may also be supported.

The media server 850 may also include one or more transcoder(s) 855. The transcoder(s) 855 may include the transcoder 113 of FIG. 1. The transcoder(s) 855 may be configured to transcode the media stream 804 to generate multiple ABR rendition(s) 865 of the media stream 804. The ABR rendition(s) 865 may be at least temporarily stored at one or more data storage device(s) 859. The data storage device(s) 859 may include the data storage device(s) 111 of FIG. 1. In a particular embodiment, the data storage device(s) 859 also store VOD content 858 and/or DVR content. For example, the transcoder(s) 855 may transcode the VOD content 858 to generate multiple ABR renditions of the VOD content 858, so that the media server 850 may provide VOD streams to one or more of the playback devices 870.

The ABR rendition(s) 865 of the media stream 804 may correspond to different quality renditions of the media stream 804. For example, the transcoder(s) 855 may generate a high-quality ABR rendition of the media stream 804 and/or may generate a lower-quality ABR rendition of the media stream 804 that is suitable for streaming in low-bandwidth network conditions. The transcoder(s) 855 may be configured to perform bitrate conversion, CODEC conversion, frame size conversion, etc. Moreover, such transcoding may be performed in response to requests from the playback devices 870. Thus, the media server 850 may be able to generate multiple ABR rendition(s) 865 of the media stream 804 for different playback devices 870 experiencing different network conditions.

The one or more ABR rendition(s) 865 may be sent to the one or more playback devices 870. Moreover, as described herein, each of the one or more ABR rendition(s) 865 may be used to communicate a platform-independent representation of source code and/or a plugin call. In a particular embodiment, depending on a playback format supported by a requesting playback device 870, and/or transcoding parameters in use by the transcoder(s) 855, the media server 850 may send one or more ABR renditions to the playback devices 870 based on requests received from the playback devices 870. In a particular embodiment, parameters used by the transcoder(s) 855 are stored in one or more transcoding template(s) 856. For example, the transcoding template(s) 856 may be computer-readable files (e.g., eXtensible markup language (XML) files) that define transcoding parameters (e.g., bitrate, type of CODEC, etc.) for various stream renditions.

The media server may also include a parser 857, which may operate as described with reference to the parser 114 of FIG. 1. For example, the parser 857 may parse source code 853 to generate a platform-independent representation of the source code (e.g., an illustrative AST 891 or 896) for communication to the playback devices 870 and other servers 880.

During operation, the media server 850 may perform transcoding of the media stream 804 (and/or the VOD content 858) for adaptive streaming. As described above, adaptive streaming is a media transmission mechanism that enables a receiving device to dynamically request different versions of a stream in response to changing network conditions. For example, one of the playback devices 870 (e.g., a desktop or laptop computing device 871, a television or set-top box 872, a smartphone 873, or a tablet computer 874) may initiate an adaptive streaming session with the media server 850 for the media stream 804 (and/or a particular VOD content 858 item) by sending a first request 862. In an illustrative example, the first request 862 is generated in response to a user selecting a link to the media stream 804 (e.g., on a webpage), where the link specifies an Internet address of the media server 850. The media server 850 may send a manifest 863 to the initiating device (e.g., the computing device 871) in response to the first request 862. The manifest 863 may include information describing each of the plurality of ABR rendition(s) 865 (if any) of the media stream 804 and/or the VOD content 858 items. For example, the transcoding template(s) 856 may define particular available ABR rendition(s) 865 of the media stream 804 and the manifest 863 may be automatically generated based on the transcoding template(s) 856.

Upon receiving the manifest 863, the computing device 871 may determine which (if any) of the available ABR rendition(s) 865 of the media stream 804 should be requested from the media server 850. For example, the computing device 871 may make such a determination based on buffering/processing capability at the computing device 871 and/or network conditions being experienced by the computing device 871. In a particular embodiment, the manifest 863 may include a platform-independent representation of source code for compilation to generate a plugin, and/or may include a plugin call that results in execution of an existing plugin.

Upon determining which ABR rendition should be requested, the computing device 871 may transmit a second request 864 to the media server 850. The second request 864 may specify a particular ABR rendition of the media stream 804. If there are no problems with receipt and playback of the requested ABR rendition of the media stream 804, the computing device 871 may continue to receive the requested ABR rendition of the media stream 804 for continued playback. However, if playback and/or network conditions become worse, the computing device 871 may switch to a lower bitrate rendition by requesting a lower bitrate ABR rendition of the media stream 804. Conversely, if playback and/or network conditions improve, the computing device 871 may switch to a higher bitrate rendition. The transcoder(s) 855 may generate key frame aligned portions for the adaptive streaming renditions, so that switching to a lower bitrate or higher bitrate ABR rendition appears "seamless" (e.g., does not result in noticeable visual glitches or dropped frames at a playback device 870, such as the computing device 871, the television/set-top box 872, the smartphone 873, or the tablet computer 874).

Thus, during an adaptive streaming session, the media server 850 may receive the second request 864 from the computing device 871 for a particular ABR rendition of the media stream 804. Upon receiving the second request 864, the media server 850 may check whether the requested ABR rendition of the media stream 804 is stored in the one or more data storage device(s) 859. If so, the media server 850 may respond to the second request 864 by retrieving the requested ABR rendition from the one or more data storage device(s) 859 and transmitting the requested ABR rendition to the computing device 871. If the requested ABR rendition is part of a different ABR rendition, the transcoder(s) 855 may generate the requested ABR rendition by transcoding the media stream 804, and the generated ABR rendition(s) 865 may be transmitted to the computing device 871 in response to the second request 864.

In a particular embodiment, sending the generated ABR rendition(s) 865 to the computing device 871 includes encoding and/or encapsulating the generated ABR rendition(s) 865 in accordance with the adaptive streaming protocol being used by the computing device 871 (e.g., HLS, HDS, smooth streaming, MPEG-DASH, etc.). As additional adaptive streaming requests are received from the computing device 871 for the same or other renditions of the VOD item, the transcoder(s) 855 may generate the additional requested portions on the fly as needed. During an adaptive streaming session, the media server 850 may use the ABR rendition(s) to provide the AST 891 to the playback devices 870. Thus, the present disclosure enables the media server 850 to send the AST 891 to the playback devices 870 regardless of what bitrate stream is being sent to the playback devices 870. Alternatively, the media server 850 may only include the AST 891 in high-bitrate renditions, because it may be difficult to communicate the AST 891 in a low-bitrate rendition without impacting playback quality at a playback device.

The described techniques may also be used to generate and transmit multiple ABR rendition(s) 866 of the media stream 804 and/or the AST 896 from the media server 850 to the other servers 880, as shown. For example, the media server 850 may transmit the ABR rendition(s) 866 and the AST 896 to another media server 881, a stream relay server, and/or to a server (e.g., an edge server) of a content delivery network (CDN) 882. To illustrate, an AST may be sent to edge servers of the CDN 882 to make a plugins more readily available for deployment to devices in different geographic regions. In a particular embodiment, requested content at the CDN 882 may be set up using a pull through caching mechanism. The CDN 882 may include one or more edge HTTP caching servers. If a cache miss for requested content occurs at a caching server, the caching server may pull the requested content from the media server 850, which acts as an origin server.

It is to be understood that the order of steps or operations described with reference to FIGS. 1-8 is to be considered illustrative, not limiting. In alternate embodiments, the order of steps may be different. Further, one or more steps may be optional and/or replaced by other steps. In addition, one or more steps may be consolidated. In accordance with various embodiments of the present disclosure, one or more methods, functions, and modules described herein may be implemented by software programs executable by a computer system. Further, implementations can include distributed processing, component/object distributed processing, and/or parallel processing.

Particular embodiments can be implemented using a computer system executing a set of instructions that cause the computer system to perform any one or more of the methods or computer-based functions disclosed herein. A computer system may include a laptop computer, a desktop computer, a server computer, a mobile phone, a tablet computer, a set-top box, a media player, one or more other computing devices, or any combination thereof. The computer system may be connected, e.g., using a network, to other computer systems or peripheral devices. For example, the computer system or components thereof may include or may be included within any one or more of the media server 110, the computing device 130, the server 240, the server 250, the media server 850, the desktop/laptop computing device 871, the TV/set-top box 872, the smartphone 873, the tablet computer 874, the media server/stream relay server 881, a server (e.g., edge server) of the CDN 882 of FIG. 8, or any combination thereof.

In a networked deployment, the computer system may operate in the capacity of a server or as a client user computer in a server-client user network environment, or as a peer computer system in a peer-to-peer (or distributed) network environment. The term "system" can include any collection of systems or sub-systems that individually or jointly execute a set, or multiple sets, of instructions to perform one or more computer functions.

In a particular embodiment, the instructions can be embodied in a computer-readable storage device or a processor-readable storage device. The terms "computer-readable storage device" and "processor-readable storage device" include a single storage device or multiple storage devices, such as a centralized or distributed database, and/or associated caches and servers that store one or more sets of instructions. The terms "computer-readable storage device" and "processor-readable storage device" also include any device that is capable of storing a set of instructions for execution by a processor or that cause a computer system to perform any one or more of the methods or operations disclosed herein. For example, a computer-readable or processor-readable storage device may include random access memory (RAM), flash memory, read-only memory (ROM), programmable read-only memory (PROM), erasable programmable read-only memory (EPROM), electrically erasable programmable read-only memory (EEPROM), registers, a hard disk, a removable disk, a disc-based memory (e.g., compact disc read-only memory (CD-ROM)), a solid-state memory, or any other form of storage device. A computer-readable or processor-readable storage device is not a signal.

As used herein, a "live" stream may differ from a "video on demand" (VOD) stream and a "digital video recorder" (DVR) stream. A VOD stream originates from, or corresponds to, content that is available in its entirety at a stream source when a packet of the VOD stream is sent. For example, a VOD stream may correspond to a movie or television show that is stored at a storage device. A live stream corresponds to content that is not available in its entirety when a packet of the live stream is sent. For example, a live stream may be used to transmit audio and/or video content corresponding to an event as the event is being captured (e.g., in real-time or near-real-time). Examples of such events may include, but are not limited to, in-progress sporting events, musical performances, video-conferences, and webcam feeds. It should be noted that a live stream may be delayed with respect to the event being captured (e.g., in accordance with government or industry regulations, such as delay regulations enforced by the Federal Communications Commission (FCC)). A DVR stream corresponds to a time-shifted version of a live stream that is generated by a device that receives the live stream, where the device may still be receiving live stream or may have finished receiving the live stream. Thus, network DVR content may be generated by a device that receives a stream via a network and "records" the received stream, such as for subsequent transmission via a network to another device. The described systems and methods may be used in conjunction with "live linear television (TV)" streams, which may include a live feed, or a VOD asset or a DVR asset being rebroadcast as a live feed. It should also be noted that although certain embodiments may be described herein with reference to video streams, video on demand content, digital video recorder content, etc., not all of the described techniques may require video content/data. Certain embodiments may also be used with content that does not include video (e.g., audio on demand, radio content, music streams, etc.).

In a particular embodiment, a method includes receiving, at a media player software application at a computing device, a first portion of a media stream, and initiating playback of the first portion of the media stream. The method also includes receiving a second portion of the media stream during the playback of the first portion of the media stream, the second portion of the media stream including a platform-independent representation of source code. The method further includes compiling the platform-independent representation of the source code to generate a platform-specific software component that is executable by the computing device. The method includes executing the platform-specific software component at the computing device during execution of the media player software application at the computing device.

In another particular embodiment, an apparatus includes a processor and a memory storing instructions that, when executed by the processor, cause the processor to perform operations including conducting a streaming session with a destination device and sending a media stream to the destination device during the streaming session. The operations further include sending a platform-independent representation of source code to the destination device during the streaming session.

In another particular embodiment, a computer-readable storage device stores an installer package for a media player software application, where the installer package is executable by a processor of a computing device to perform operations including installing the media player software application at the computing device and installing a compiler at the computing device. The media player software application is executable by the processor to, during playback of a media stream, perform operations including receiving an abstract syntax tree (AST) in the media stream, invoking the compiler to compile the AST to generate a platform-specific plugin, and executing the platform-specific plugin.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A computing device comprising:
a processor; and
a memory storing a media player executable to cause the processor to:
receive a first portion of a media stream;
initiate playback of the first portion of the media stream;
receive a second portion of the media stream during the playback of the first portion of the media stream, the second portion of the media stream including a platform-independent representation of source code;
compile the platform-independent representation of source code to generate a platform-specific component; and
execute the platform-specific component.

2. The computing device of claim 1, wherein the memory further stores a compiler configured to compile the platform-independent representation without interruption of playback of the media stream.

3. The computing device of claim 2, wherein the compiler is part of the media player.

4. The computing device of claim 1, further comprising a network interface configured to receive the first portion and the second portion in accordance with a streaming protocol.

5. The computing device of claim 1, wherein the processor and the memory are included in a laptop computer, a desktop computer, a tablet computer, a mobile phone, a game console, a set-top box, a television, or any combination thereof.

6. The computing device of claim 1, wherein the media player is part of an operating system.

7. The computing device of claim 1, further comprising a network interface configured to download the media player via a network.

8. The computing device of claim 1, wherein the platform-independent representation comprises an abstract syntax tree (AST).

9. The computing device of claim 1, wherein the processor is configured to execute the platform-specific component without interruption of playback of the media stream.

10. The computing device of claim 1, wherein the platform-specific component comprises a plugin of the media player.

11. The computing device of claim 10, wherein the plugin comprises a social networking client that enables communication via a social network.

12. The computing device of claim 10, wherein the plugin enables communication with a server associated with the media stream.

13. The computing device of claim 1, wherein the memory further stores the platform-specific component, and further comprising a network interface configured to receive a signal to re-execute the platform-specific component, and wherein the processor is configured to retrieve the platform-specific component from the memory and to re-execute the platform-specific component without recompilation of the platform-independent representation.

14. The computing device of claim 1, wherein the processor is configured to delete the platform-specific component after execution.

15. A method comprising:
sending a first portion of a media stream from a media server to a destination device during a streaming session;
after sending the first portion of the media stream, sending a platform-independent representation of source code from the media server to the destination device during the streaming session; and
after sending the platform-independent representation, sending a signal to the destination device during the streaming session, the signal requesting execution of a platform-specific software component generated by compilation of the platform-independent representation.

16. A method comprising:
receiving a compiler at a computing device; and
executing a media player at the computing device, wherein executing the media player includes, during playback of a media stream and without interrupting playback of the media stream:
receiving an abstract syntax tree (AST) in the media stream;
invoking the compiler to compile the AST to generate a platform-specific component; and
executing the platform-specific component.

17. The method of claim 16, further comprising receiving the media player at the computing device, wherein the compiler is part of the media player.

18. The method of claim 16, wherein the compiler is distinct from the media player.

19. The method of claim 16, further comprising receiving, in the media stream, a signal to re-execute the platform-specific component.

20. The method of claim 16, further comprising receiving, in a second media stream, a signal to re-execute the platform-specific component.

* * * * *